Jan. 22, 1935.   F. D. FOWLER   1,988,787
MANUFACTURE OF EMBOSSED SHEET MATERIAL AND ROLL FOR PRODUCING SAME
Filed May 23, 1933
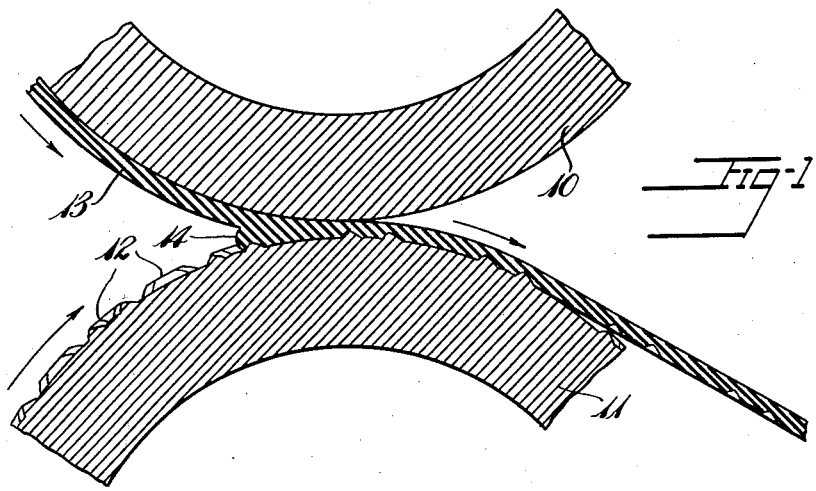
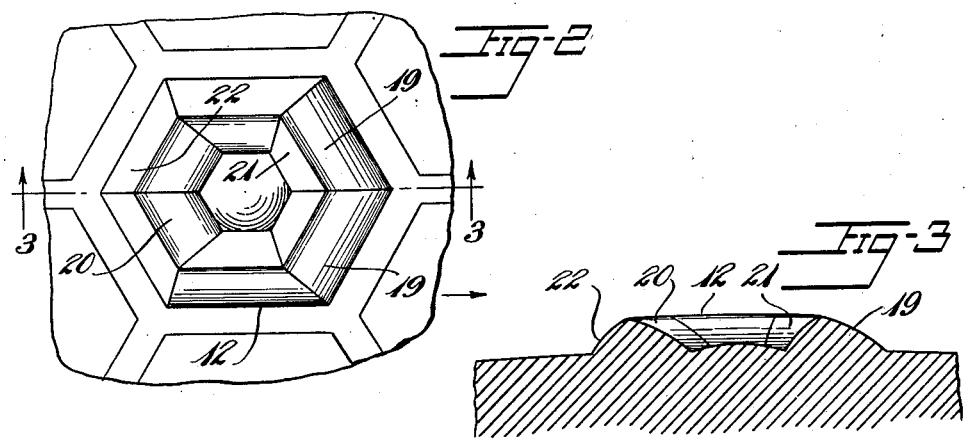
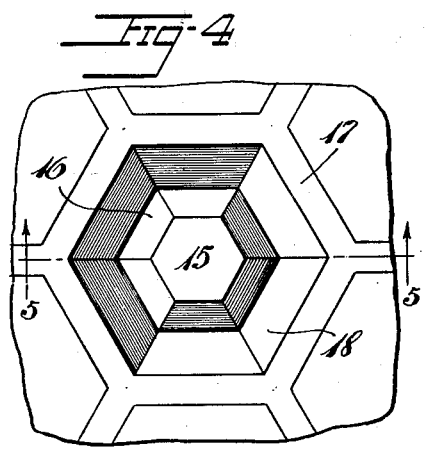
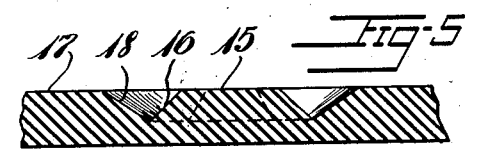
Inventor
Fred D. Fowler
By Eakin & Avery
Attys.

Patented Jan. 22, 1935

1,988,787

UNITED STATES PATENT OFFICE 1,988,787

MANUFACTURE OF EMBOSSED SHEET MATERIAL AND ROLL FOR PRODUCING SAME

Fred D. Fowler, Newton, Mass., assignor to Hood Rubber Company, Inc., Watertown, Mass., a corporation of Delaware Application May 23, 1933, Serial No. 672,444

4 Claims. (Cl. 18—10)

This invention relates to the manufacture of embossed sheets from plastic material and apparatus for producing the same, and is more particularly related to the production of plastic sheets by the rolling process.

Heretofore it has been the practice to form sheets from plastic material by calendering the material between rolls, one of which was engraved in reverse of the desired design. The use of such rolls has been limited to designs in which the design elements were extremely shallow. Where it was necessary to deeply emboss sheets of plastic material and accuracy of design was required, such embossing was accomplished by flat dies or molds. The size of the sheet was necessarily quite limited and results not always satisfactory.

The principal objects of this invention are to provide accuracy in the production of embossed sheet material, to reduce cost of manufacture, and to provide improved apparatus.

Other objects will appear from the following description and the accompanying drawing.

In the drawing:

Fig. 1 is a sectional elevation of a pair of co-operating calender rolls showing the plastic material being formed into an embossed sheet, part of the rolls being broken away.

Fig. 2 is a detail view showing a design forming unit on the face of a calender roll.

Fig. 3 is a section taken on line 3—3 of Fig. 2.

Fig. 4 is a detail view showing a design unit of an embossed sheet.

Fig. 5 is a section taken on line 5—5 of Fig. 4.

Referring to the drawing, the numeral 10 designates one of the smooth faced rolls of a rubber calender, and the numeral 11, an embossed roll made according to the present invention and provided with raised embossing elements 12. The plastic material such as an unvulcanized rubber compound has been formed by the parts of the calendar not shown as a smooth surfaced sheet 13, and following the roll 10 to the bight of rolls 10, 11, forms a small bank 14 of material at the bight. This bank of material, as is well known in the art, compensates for any fluctuation in the feed of material from the bight such as would be caused by the presence or absence of design forming elements on the roll 11.

The invention is best illustrated by an example of a specific design. In the drawing the design chosen for illustration comprises a repeat pattern of hexagonal units, one of which is shown in Figs. 4 and 5 and which consists of a frustum of a hexagonal pyramid having a top facet 15 in the same plane as the normal face 17 of the sheet surrounded by side facets 16, a groove, V-shaped in cross-section surrounds the pyramided frustrum and is defined by the facets 16 and adjacent facets 18.

I find that where the roll 11 is engraved so as to be provided with a surface the reverse of the desired design, the embossed sheet does not conform to the desired design but is greatly distorted. The rubber composition during the calendering operation is stretched in the direction of its travel and upon cooling shrinks in the direction of its travel without substantial decrease in volume, thereby causing a lateral expansion of the sheet. In order to compensate for this shrinkage, which may even exceed ten per cent, I form the raised embossing elements 12 of increased length in a direction of travel of the pattern roll and of decreased width laterally thereof, the increase in length and decrease in width being determined by the shrinkage of the composition.

I also find that surfaces such as the facets 16 and 18 which have been formed by displacement of the compound by the raised elements 12 of the pattern roll are found to be convexed by the recovery of the stock when the facets by which they were formed were true planes. To counteract this difficulty the forming facets on the roll are made convex as to form concave cavities in the sheet, the degree of convexity being determined from the recovery properties of the composition.

As the bank 14 of plastic material is progressively confined between the rolls the material midway of its thickness tends to flow in the opposite direction from that in which the rolls are travelling, whereas the stock in contact with each roll tends to adhere thereto and to be carried forward, this apparently results in an internal strain being set up in the rolled sheet which causes a shifting forward of the zone of material between the two faces of the sheet, ordinarily causing a displacement of the material surrounding any deep depression formed in the sheet. To compensate for this distortion I form the pattern roll with the elevated portions of the design forming elements 12 rearwardly displaced or in retarded position with relation to the other elements of the design nearer the face 11 of the roll, the adjacent faces adapted to form the facets 16, 18 being made at various angles as shown in Figs. 2 and 3 where it will be noted that the leading facets 19, 20, of the hexagonal ridge, are less steep than the trailing facets 21, 22.

The necessary rearward displacement of the ridge depends upon the composition of the plastic material and upon the elevation of the ridge and is best determined by trial.

I claim:

1. The method of making an embossed sheet of plastic material which comprises sheeting the plastic material between calendar rolls, concurrently pressing into a face of the sheet a raised design-molding element of one of the rolls having convexed facets, and cooling and shrinking the stock so as to flatten the facets formed in the sheet.

2. The method of making an embossed sheet of plastic material which comprises sheeting the plastic material between calendar rolls, concurrently pressing into a face of the sheet a raised design-molding element of one of the rolls having the general configuration of a desired impression but with its more elevated portions more retarded with respect to the advance of the roll than those portions nearer the roll face, and cooling and shrinking the sheet to cause the impression to attain the desired form.

3. A pattern roll for embossing plastic material, said roll being provided with a raised design embossing element, the faces of said element being more convex than the corresponding faces of the design to be impressed.

4. A pattern roll for embossing plastic material said roll being provided with a raised design-embossing element, the tops of said element being located in a more retarded position with relation to the revolution of the roll than those parts of the element located at the face of the roll.

FRED D. FOWLER.